United States Patent
Shin et al.

(10) Patent No.: US 8,412,104 B2
(45) Date of Patent: Apr. 2, 2013

(54) METHOD AND APPARATUS OF CONTROLLING INTER CELL INTERFERENCE BASED ON COOPERATION OF INTRA CELL TERMINALS

(75) Inventors: Won Jae Shin, Yongin-si (KR); Cheul Soon Kim, Daejeon (KR); Chang Yong Shin, Seoul (KR); Won Jong Noh, Yongin-si (KR); Hyun Ho Choi, Suwon-si (KR); Young Chul Sung, Daejeon (KR); Yong Hoon Lee, Daejeon (KR)

(73) Assignees: Samsung Electronics Co., Ltd., Suwon-si (KR); Korea Advanced Institute of Sciencc and Technology, Daejeon (KR)

( * ) Notice: Subject to any disclaimer, the term of this patent is extended or adjusted under 35 U.S.C. 154(b) by 117 days.

(21) Appl. No.: 13/157,181

(22) Filed: Jun. 9, 2011

(65) Prior Publication Data
US 2012/0122502 A1    May 17, 2012

(30) Foreign Application Priority Data
Nov. 16, 2010   (KR) .................. 10-2010-0113911

(51) Int. Cl.
*H04B 1/00*   (2006.01)
*H04B 15/00*  (2006.01)

(52) U.S. Cl. ............. 455/63.1; 455/67.13; 455/450; 455/452.2; 455/436; 455/114.1; 455/561; 370/329; 370/331; 370/341; 370/394; 375/144; 375/346; 375/348

(58) Field of Classification Search ............ 455/63.1, 455/67.13, 114.1, 561, 450, 452.2, 436
See application file for complete search history.

(56) References Cited

U.S. PATENT DOCUMENTS

| | | | |
|---|---|---|---|
| 6,178,196 B1 * | 1/2001 | Naguib et al. | 375/148 |
| 7,075,906 B2 * | 7/2006 | Douglas et al. | 370/328 |
| 7,096,041 B2 * | 8/2006 | Brunner et al. | 455/562.1 |
| 7,656,936 B2 | 2/2010 | Li et al. | |
| 7,830,995 B2 * | 11/2010 | Ojard | 375/346 |
| 8,023,961 B2 * | 9/2011 | Yanagihara | 455/456.1 |
| 8,121,079 B2 * | 2/2012 | Geng et al. | 370/329 |
| 8,184,594 B2 * | 5/2012 | Li et al. | 370/331 |
| 2003/0206577 A1 | 11/2003 | Liberti, Jr. et al. | |
| 2004/0203474 A1 | 10/2004 | Miller et al. | |
| 2008/0261645 A1 | 10/2008 | Luo et al. | |
| 2010/0067362 A1 | 3/2010 | Sakaguchi et al. | |
| 2011/0060956 A1 * | 3/2011 | Goldsmith et al. | 714/746 |
| 2012/0069784 A1 * | 3/2012 | Kim et al. | 370/312 |

FOREIGN PATENT DOCUMENTS

| | | |
|---|---|---|
| KR | 10-2008-0072195 | 8/2008 |
| KR | 10-2009-0108358 | 10/2009 |
| KR | 10-0964438 | 6/2010 |

* cited by examiner

*Primary Examiner* — Marceau Milord
(74) *Attorney, Agent, or Firm* — NSIP Law

(57) ABSTRACT

Provided is a method and apparatus for controlling inter cell interference based on cooperation between intra cell terminals. The intra cell terminals may exchange interference channel information, and may determine a receive beamforming vector based on the exchanged interference channel information. At least one intra cell terminal may feed back, to a neighboring cell base station, information associated with an effective interference channel using the receive beamforming vector. A base station may determine a transmit beamforming vector based on information associated with an effective interference channel using receive beamforming vectors of neighboring cell terminals that are received from at least one neighboring cell terminal.

21 Claims, 8 Drawing Sheets

METHOD AND APPARATUS OF CONTROLLING INTER CELL INTERFERENCE BASED ON COOPERATION OF INTRA CELL TERMINALS

CROSS-REFERENCE TO RELATED APPLICATION(S)

This application claims the benefit under 35 U.S.C. §119(a) of Korean Patent Application No. 10-2010-0113911, filed on Nov. 16, 2010, in the Korean Intellectual Property Office, the entire disclosure of which is incorporated herein by reference for all purposes.

FIELD

The following description relates to a method and apparatus for controlling inter cell interference based on cooperation between intra cell terminals.

BACKGROUND

Many mobile communication systems use a high carrier frequency to sufficiently secure frequency resources, although this may result in cell coverage decreasing. Because of the decrease in the cell coverage, attempts have been made to increase a distance between cells, to increase a transmit power, and/or the like. According to the above attempts, users positioned at a cell edge may experience relatively great interference from adjacent cells. Communication performance may be enhanced by controlling interference through inter cell cooperation. However, overhead may occur for exchanging of information for the inter cell cooperation. In particular, cooperation between base stations may use a relatively large amount of resources for an initialization process.

SUMMARY

According to an aspect, a communication method of a first target terminal corresponding to a target base station of a target cell in a multi-cell communication system includes receiving, from a second target terminal corresponding to the target base station, information associated with an interference channel from a neighboring base station of a neighboring cell to the second target terminal, determining a receive beamforming vector of the first target terminal based on information associated with an interference channel from the neighboring base station to the first target terminal and information associated with an interference channel from the neighboring base station to the second target terminal, so that an effective interference channel from the neighboring base station to the first target terminal that is associated with the receive beamforming vector of the first target terminal and an effective interference channel from the neighboring base station to the second target terminal that is associated with a receive beamforming vector of the second target terminal may be aligned in the same spatial dimension, and transmitting, to the neighboring base station, information associated with the effective interference channel from the neighboring base station to the first target terminal that is associated with the receive beamforming vector of the first target terminal.

The receiving may include receiving, from the second target terminal, information associated with the interference channel from the neighboring base station to the second target terminal using a resource orthogonal to a resource used in the target cell or a wireless fidelity (Wi-Fi) system.

The transmitting may include transmitting information associated with the effective interference channel from the neighboring base station to the first target terminal when the second terminal does not transmit, to the neighboring base station, information associated with the effective interference channel from the neighboring base station to the first target terminal or information associated with the effective interference channel from the neighboring base station to the second target terminal.

The transmitting may include transmitting, to the neighboring base station via the target base station, information associated with the effective interference channel from the neighboring base station to the first target terminal.

The method may further include transmitting, to the second target terminal, information associated with the interference channel from the neighboring base station to the first target terminal.

The determining may include determining the receive beamforming vector of the second target terminal based on information associated with the interference channel from the neighboring base station to the first target terminal and information associated with the interference channel from the neighboring base station to the second target terminal, so that the effective interference channel from the neighboring base station to the first target terminal that is associated with the receive beamforming vector of the first target terminal and the effective interference channel from the neighboring base station to the second target terminal that is associated with the receive beamforming vector of the second target terminal may be aligned in the same spatial dimension.

The method may further include transmitting, to the second target terminal, information associated with the receive beamforming vector of the second target terminal.

According to an aspect, a communication method of a target base station of a target cell in a multi-cell communication system includes receiving information associated with at least one of effective interference channels from the target base station to neighboring terminals of a neighboring cell when receive beamforming vectors of the neighboring terminals are determined so that the effective interference channels from the target base station to the neighboring cells that is associated with receive beamforming vectors of the neighboring terminals may be aligned in the same spatial dimension, and determining a transmit beamforming vector for a first target terminal corresponding to the target base station, so that at least one of the effective interference channels from the target base station to the neighboring terminals, and an effective serving channel from the target base station to the second target terminal corresponding to the target base station that is associated with a receive beamforming vector of the second target terminal may be nulled.

The method may further include performing precoding based on the transmit beamforming vector for the first target terminal.

The receiving may include receiving, from either a neighboring base station of the neighboring cell or at least one of the neighboring terminals, information associated with at least one of the effective interference channels from the target base station to the neighboring terminals.

The method may further include receiving information associated with an effective interference channel from a neighboring base station of the neighboring cell to the first target terminal that is associated with the receive beamforming vector of the first target terminal, and transmitting, to the neighboring base station, information associated with the effective interference channel from the neighboring base station to the first target terminal.

The method may further include receiving, from the second target terminal, information associated with the effective serving channel from the target base station to the second target terminal that is associated with the receive beamforming vector of the second target terminal.

The method may further include determining a transmit beamforming vector for the second target terminal corresponding to the target base station, so that at least one of the effective interference channels from the target base station to the neighboring terminals and an effective servicing channel from the target base station to the first target terminal corresponding to the target base station that is associated with a receive beamforming vector of the first target terminal may be nulled.

According to an aspect, a first target terminal corresponding to a target base station of a target cell in a multi-cell communication system includes a receiver configured to receive, from a second target terminal corresponding to the target base station, information associated with an interference channel from a neighboring base station of a neighboring cell to the second target terminal, a receive beamforming vector determining unit configured to determine a receive beamforming vector of the first target terminal based on information associated with an interference channel from the neighboring base station to the first target terminal and information associated with an interference channel from the neighboring base station to the second target terminal, so that an effective interference channel from the neighboring base station to the first target terminal that is associated with the receive beamforming vector of the first target terminal and an effective interference channel from the neighboring base station to the second target terminal that is associated with a receive beamforming vector of the second target terminal may be aligned in the same spatial dimension, and a transmitter configured to transmit, to the neighboring base station, information associated with the effective interference channel from the neighboring base station to the first target terminal that is associated with the receive beamforming vector of the first target terminal.

The receiver may be configured to receive, from the second target terminal, information associated with the interference channel from the neighboring base station to the second target terminal using a resource orthogonal to a resource used in the target cell or a wireless fidelity (Wi-Fi) system.

The transmitter may be configured to transmit information associated with the effective interference channel from the neighboring base station to the first target terminal when the second terminal does not transmit, to the neighboring base station, information associated with the effective interference channel from the neighboring base station to the first target terminal or information associated with the effective interference channel from the neighboring base station to the second target terminal.

The transmitter may be configured to transmit, to the neighboring base station via the target base station, information associated with the effective interference channel from the neighboring base station to the first target terminal.

The transmitter may be configured to transmit, to the second target terminal, information associated with the interference channel from the neighboring base station to the first target terminal.

The receive beamforming vector determining unit may be configured to determine the receive beamforming vector of the second target terminal based on information associated with the interference channel from the neighboring base station to the first target terminal and information associated with the interference channel from the neighboring base station to the second target terminal, so that the effective interference channel from the neighboring base station to the first target terminal that is associated with the receive beamforming vector of the first target terminal and the effective interference channel from the neighboring base station to the second target terminal that is associated with the receive beamforming vector of the second target terminal may be aligned in the same spatial dimension.

The transmitter may be configured to transmit, to the second target terminal, information associated with the receive beamforming vector of the second target terminal.

The first target terminal may further include a channel estimator configured to estimate a serving channel from the target base station to the first target terminal based on a pilot signal received from the target base station, and to estimate an interference channel from the neighboring base station to the first target terminal based on a pilot signal received from the neighboring base station.

According to an aspect, a terminal used in a cell may include a receiver configured to receive, from another terminal in the same cell as the terminal, information associated with an interference channel between a neighboring cell and the another terminal; a receive beamforming vector determining unit configured to determine a receive beamforming vector based on the information associated with the interference channel between the neighboring cell and the another terminal, wherein an effective interference channel between the neighboring cell and the terminal using the receive beamforming vector and the effective interference channel between the neighboring cell and the another terminal are aligned in the same spatial dimension; and a transmitter configured to transmit, to the neighboring cell, information associated with the effective interference channel between the neighboring cell and the terminal.

According to an aspect, a base station used in a cell may include a receiver configured to receive information associated an effective interference channel from a neighboring cell; and a transmit beamforming vector determining unit configured to determine a transmit beamforming vector for a terminal in the cell based on the information associated with the effective interference channel from the neighboring cell such that (i) an effective interference channel from the base station to a terminal in the neighboring cell, (ii) an effective serving channel from the base station to another terminal in the cell, or both, are nulled.

The base station may further include a precoding unit configured to perform precoding based on the transmit beamforming vector for the terminal in the cell.

The base station may further include a transmitter configured to transmit information to the neighboring cell.

According to an aspect, a method for exchanging interference channel information between terminals in a multi-cell communication system may include receiving interference channel information from at least one terminal in a cell; determining a receive beamforming vector based on the received interference channel information; transmitting to a neighboring cell information associated with an effective interference channel using the receive beamforming vector.

The method may further include determining a transmit beamforming vector based on information associated with an effective interference channel using receive beamforming vectors of neighboring cell terminals.

Other features and aspects will be apparent from the following detailed description, the drawings, and the claims.

Figure 1:
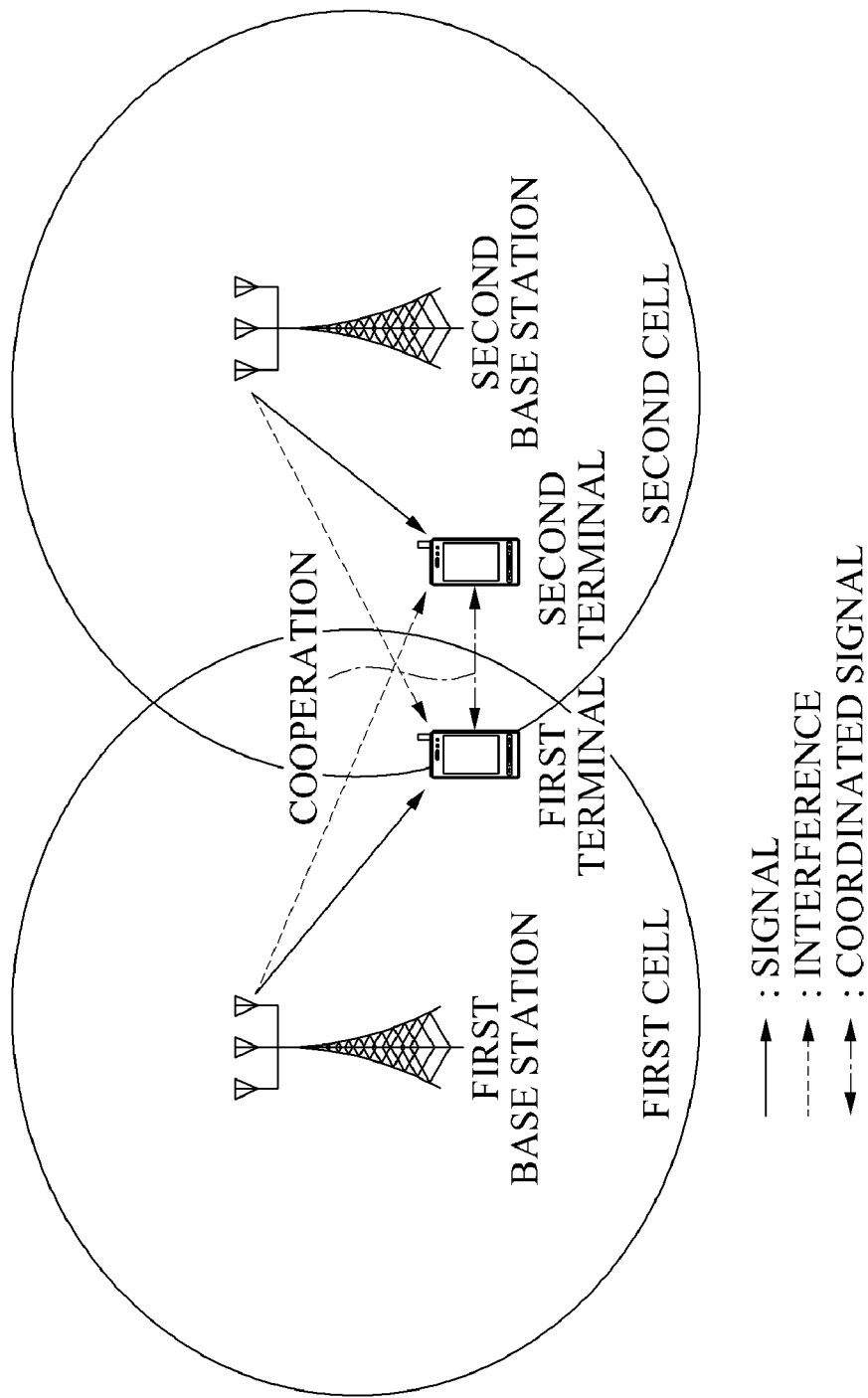
FIG. 1 is a diagram illustrating cooperation between terminals when inter cell interference is present in a multi-cell communication system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

When it is determined detailed description related to a related known function or configuration they may make the purpose of the embodiments unnecessarily ambiguous in describing the embodiments, the detailed description will be omitted here. Also, terms used herein are defined to appropriately describe the embodiments and thus may be changed depending on a user, the intent of an operator, or a custom. Accordingly, the terms must be defined based on the following overall description of this specification. Like reference numerals refer to the like elements throughout.

One or more embodiments disclosed herein may be used to control inter cell interference based on cooperation between intra cell terminals. The intra cell terminals may exchange interference channel information, and may determine a receive beamforming vector based on the exchanged interference channel information. At least one intra cell terminal may provide feedback, to a neighboring cell base station, information associated with an effective interference channel using the receive beamforming vector. And a base station may determine a transmit beamforming vector based on information associated with an effective interference channel using receive beamforming vectors of neighboring cell terminals that are received from at least one neighboring cell terminal.

FIG. 1 illustrates cooperation between terminals when inter cell interference is present in a multi-cell communication system. And FIG. 2 illustrates cooperation between terminals when inter cell interference is present in a hierarchical cell communication system.

Figure 2:
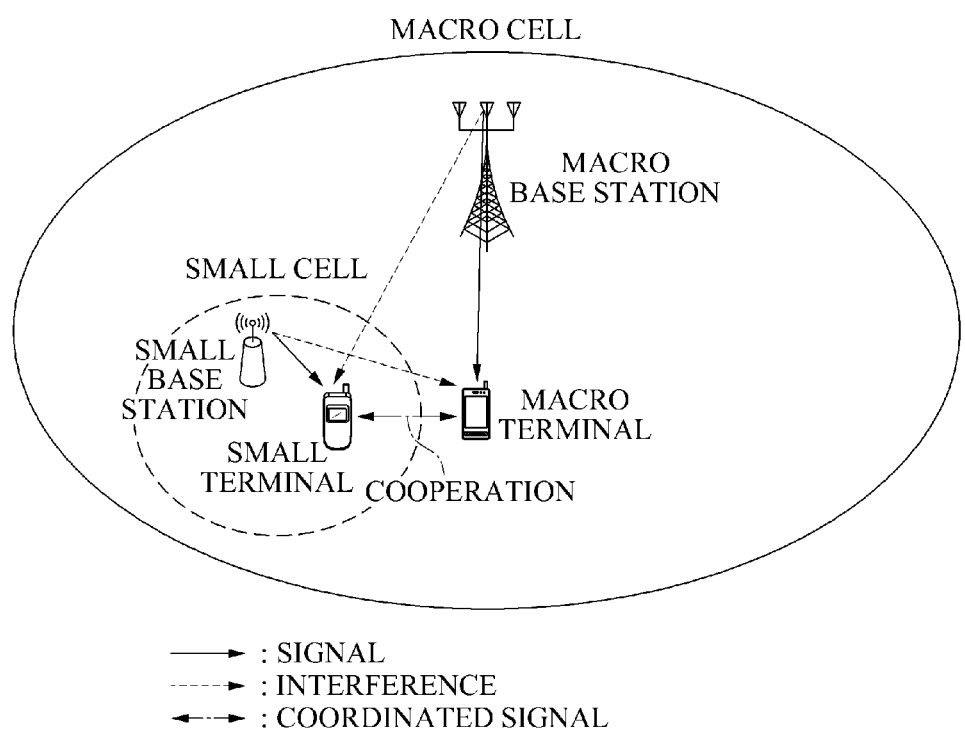
FIG. 2 is a diagram illustrating cooperation between terminals when inter cell interference is present in a hierarchical cell communication system.

Referring to FIG. 1 and FIG. 2, the multi-cell communication system may correspond to a system in which cells are installed to be adjacent to each other, such as, for example, a cellular environment. The hierarchical cell communication system may correspond to a system in which a small cell, for example, a micro cell, a pico cell, a femtocell, and/or the like, is installed within a large cell, for example, a macro cell.

The cooperation between terminals may indicate exchanging of cooperative signals using a communication module, for example, a wireless local area network (LAN) module, a Bluetooth module, and/or the like, excluding a cellular communication scheme installed in the terminals. For example, the cooperative signal may correspond to information used when the terminals increase a signal component or reduce interference. Through exchanging of the cooperative signals, the terminals may reduce the interference component and enhance a signal to interference plus noise ratio (SINR). The terminals may enhance a reception rate of the terminals.

As shown in FIG. 1 and FIG. 2, in an environment where the inter cell interference is present, the cooperation between terminals belonging to different cells may enhance the reception rate of the terminals.

In general, the cooperation between the terminals may be performed using two methods.

In a first method, a terminal offering a help may forward, to a terminal being helped, a signal component of the terminal being helped. This method is referred to a signal forwarding (SF) method. For example, referring to FIG. 1, when a first terminal belonging to a first cell corresponds to the terminal being helped and a second terminal belonging to a second cell corresponds to the terminal offering the help, the second terminal may forward, to the first terminal, a signal component of the first terminal received from a first base station. Similarly, referring to FIG. 2, when a small terminal belonging to a small cell corresponds to the terminal being helped and a macro terminal belonging to a macro cell corresponds to the terminal offering the help, the macro terminal may forward, to the small terminal, a signal component of the small terminal received from a small base station. This first method may be applicable to a case where the macro terminal corresponds to the terminal being helped.

In a second method, the terminal offering the help may decode a signal component of the terminal offering the help, that is, an interference component of the terminal being helped, and may forward the decoded signal component to the terminal being helped. This method is referred to as an interference forwarding (IF) method. For example, referring to FIG. 1, when the first terminal corresponds to the terminal being helped and the second terminal corresponds to the terminal offering the help, the second terminal may decode a signal component of the second terminal received from a second base station, and may forward, to the first terminal, the decoded signal component of the second terminal, that is, an interference component of the first terminal. Similarly, referring to FIG. 2, when the small terminal corresponds to the terminal being helped and the macro terminal corresponds to the terminal offering the help, the macro terminal may decode a signal component signal of the macro terminal received from the macro base station, and may forward, to the small terminal, the decoded signal component of the macro terminal, that is, an interference component of the small terminal. This second method may be applicable to a case where the macro terminal corresponds to the terminal being helped.

A cooperation method between terminals based on a received signal such as the SF method and the IF method may be performed when a coordinated channel state between the terminals is good, and may use additional overhead, for example, exchanging of a codebook, and/or the like. However, it may be difficult to embody the cooperation method.

Thus, according to one or more embodiments, there may be provided a cooperation method between terminals based on sharing of channel information instead of the cooperation method between the terminals based on the received signal.

Figure 3:
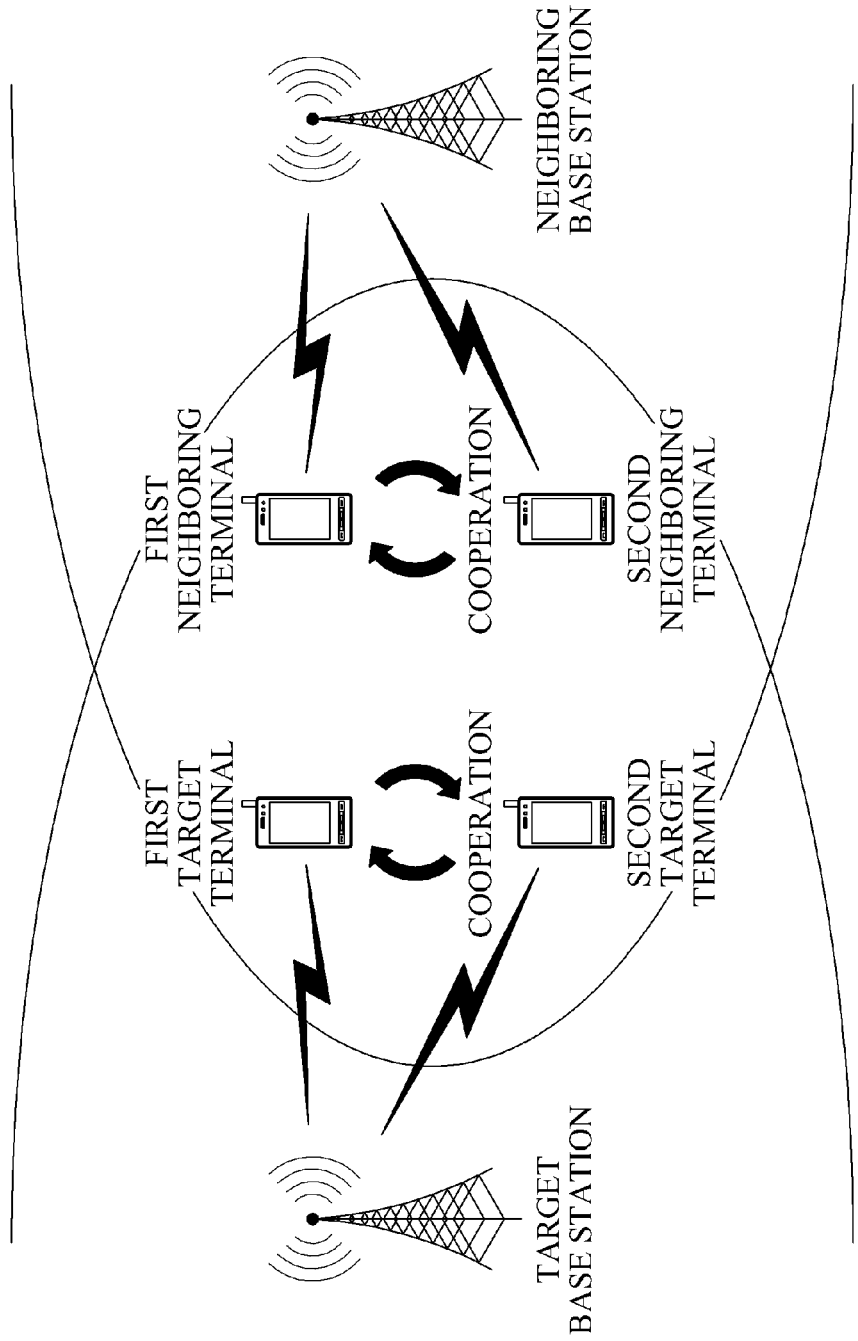
FIG. 3 is a diagram illustrating a communication system to perform cooperation between intra cell terminals.

FIG. 3 illustrates a communication system to perform cooperation between intra cell terminals.

One or more embodiments may use a multi-cell multi-user interference channel environment. A plurality of terminals, for example, receive interference from an adjacent cell may be present within a cell. In this case, the terminals may be affected by inter cell interference (ICI) and inter user interference (IUI).

As a method to effectively control the above various interferences, interference alignment (IA) technology may be used. However, to apply the IA technology, all the terminals may need to feed back total channels, that is, a serving channel and an interference channel to a base station using an uplink resource. Accordingly, it may be difficult to construct a communication system.

According to one or more embodiments, there is provided a cooperation method between intra cell terminals instead of a communication method between inter cell terminals, in order to complement relatively great feedback overhead occurring in the IA technology. The cooperation method according to the embodiments corresponds to the cooperation method between terminals based on sharing of channel information and thus, overhead of a coordinated channel may significantly decrease compared to the cooperation method between terminals based on the received terminal.

<System Model>

For ease of description, two cells are illustrated in FIG. 3. However, an interference controlling based on cooperation between intra cell terminals may be applicable where three or more cells are present. It may be assumed that each of base stations includes M antennas, K terminals adjacent to a neighboring cell are present at an edge of each cell, and that each of the K terminals includes N antennas.

In addition, it may be assumed that all the terminals present within each cell may share information associated with an interference channel using another communication resource instead of using a cellular resource, for example, wireless-fidelity (Wi-Fi), Bluetooth, and/or the like. The above assumptions may be applicable to a case where terminals present at a cell edge are gathered in a local area, such as, for example, a library, a building, and/or the like.

Also, it may be assumed that a $k^{th}$ terminal in an $i^{th}$ cell is indicated as terminal[k,i] and each base station may transmit a different signal streams to one or more terminals corresponding to each base station.

Base Station-terminal Link (Cellular Network)

A received signal $y^{[k,i]}$ of terminal[k,i] may be expressed by Equation 1.

$$y^{[k,i]} = \sum_{i'=1}^{2} H_{i'}^{[k,i]} \sum_{k'=1}^{K} v^{[k',i]} s^{[k',i]} + n^{[k,i]} = \underbrace{H_{i}^{[k,i]} v^{[k,i]} s^{[k,i]}}_{\text{desired signal}} + \sum_{k'=1, k' \neq k}^{K} \underbrace{H_{i}^{[k,i]} v^{[k',i]} s^{[k',i]}}_{\text{inter-user interference}} + \sum_{k'=1}^{K} \underbrace{H_{\bar{i}}^{[k,i]} v^{[k',\bar{i}]} s^{[k',\bar{i}]}}_{\text{inter-cell interference}} + n^{[k,i]},$$ [Equation 1]

In Equation 1, $s^{[k,i]}$ corresponds to data transmitted by an $i^{th}$ base station, that is, a base station of an $i^{th}$ cell for the terminal [k,i], and $v^{[k,i]}$ corresponds to a transmit beamforming vector for the terminal[k,i]. The data and the transmit beamforming vector for the terminal[k,i] may need to satisfy $E[\Sigma_{k=1}^{K} \|v^{[k,i]} s^{[k,i]}\|^2] \leq P$. $n^{[k,i]}$ corresponds to N×1 additive white Gaussian noise (AWGN) vector. A variance of each of elements of $n^{[k,i]}$ may be assumed as $\sigma^2$. $H_{j}^{[k,i]}$ which corresponds to an N×M dimensional channel matrix from a $j^{th}$ base station to the terminal[k,i]. Here, $\bar{i}$ corresponds to a base station index indicating a base station of a cell different from the $i^{th}$ cell. For example, $\forall i; \bar{i} \in \{1,2\}$ may need to be satisfied.

Each terminal may obtain a desired signal by multiplying a received signal by a received beamforming vector. An effective received signal $\tilde{y}^{[k,i]}$ obtained by multiplying the received signal by the receive beamforming vector may be expressed by Equation 2.

$$\tilde{y}^{[k,i]} = w^{[k,i]\dagger} H_{i}^{[k,i]} v^{[k,i]} s^{[k,i]} + w^{[k,i]\dagger} \sum_{k'=1, k' \neq k}^{K} H_{i}^{[k,i]} v^{[k',i]} s^{[k',i]} + w^{[k,i]\dagger} \sum_{k'=1}^{K} H_{\bar{i}}^{[k,i]} v^{[k',\bar{i}]} s^{[k',\bar{i}]} + \tilde{n}^{[k,i]},$$ [Equation 2]

In Equation 2, $w^{[k,i]}$ corresponds to a receive beamforming vector of terminal[k,i]. $w^{[k,i]}$ corresponds to an N×1 dimensional vector. $\tilde{n}^{[k,i]} = w^{[k,i]\dagger} n^{[k,i]}$ corresponds to an effective noise vector, $\tilde{n}^{[k,i]}$ the same distribution of random variables as $n^{[k,i]}$, and $(\bullet)^{554}$ corresponds to a Hermitian operation and is the same as a conjugate transpose operation.

Cooperative Link Between Intra Cell Terminals (Wi-Fi Network, and the Like)

The cooperative link between intra cell terminals, that is, a link between a first target terminal and a second target terminal, or a link between a first neighboring terminal and a second neighboring terminal, may be generated using a network supporting an ad hoc mode, for example, Wi-Fi and the like, and may not cause a bad effect, for example, interference and the like, in a cellular network. It may be assumed that the cooperative link between intra cell terminals may maintain a quality sufficient to share information associated with an interference channel.

Degrees of Freedom (DoF)

When a transmit beamforming vector $v^{[k,i]}$ and a receive beamforming vector $w^{[k,i]}$ of each of all the terminals are determined, an achievable rate of terminal[k,i] may be expressed by Equation 3.

$$R^{[k,i]}(v^{[1,1]}, v^{[2,1]}, \ldots, v^{[K,1]}, v^{[1,2]}, v^{[2,2]}, \ldots, v^{[K,2]}, w^{[k,i]}) = \log_2\left(1 + \frac{|w^{[k,i]\dagger} H_{i}^{[k,i]} v^{[k,i]}|^2}{\sigma^2 + \sum_{k'=1, k' \neq k}^{K} |w^{[k,i]\dagger} H_{i}^{[k,i]} v^{[k',i]}|^2 + \sum_{k'=1}^{K} |w^{[k,i]\dagger} H_{\bar{i}}^{[k,i]} v^{[k',\bar{i}]}|^2}\right)$$ [Equation 3]

As an evaluation standard in a signal to noise ratio (SNR), DoF d may be defined as shown in Equation 4.

$$d \triangleq \lim_{\rho \to \infty} \frac{R(\rho)}{\log(\rho)} = \sum_{k \in \{1, \ldots, K\}} \sum_{i \in \{1,2\}} d^{[k,i]} \quad [\text{Equation 4}]$$

Hereinafter, an interference controlling method in the system model constructed as above will be described.

Figure 4:
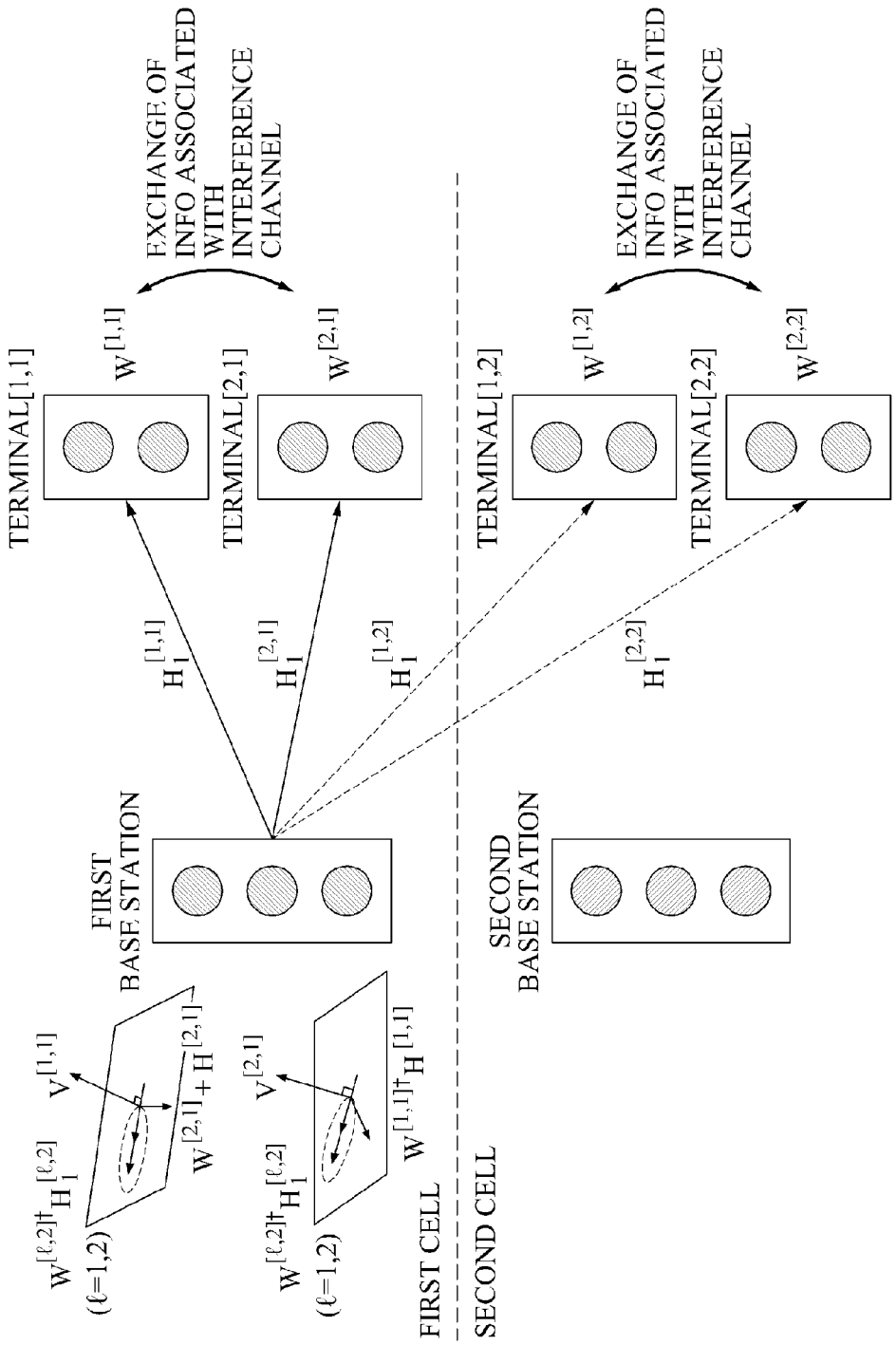
FIG. 4 is a diagram illustrating a communication process of a communication system to perform cooperation between intra cell terminals.

FIG. 4 illustrates a communication process of a communication system to perform a cooperation between intra cell terminals.

M corresponds to a number of antennas installed in a base station, N corresponds to a number of antennas installed in a terminal, and K corresponds to a number of terminals for each cell. As shown in FIG. 4, M=3, N=2 and K=2. Of course, these variables may vary in other instances.

In general, in a multi-cell multi-user interference channel environment as shown in FIG. 4, due to inter cell interference, interference between intra cell terminals, and/or the like, a transmit beamforming vector $V^{[1,1]}$ for terminal[1,1] may need to be designed as given by Equation 5.

$$v^{[1,1]} \subset \text{null}\left(\left[\underbrace{(w^{[2,1]\dagger}H_1^{[2,1]})^\dagger}_{\text{effective IUI channel}}, \underbrace{(w^{[1,2]\dagger}H_1^{[1,2]})^\dagger, (w^{[2,2]\dagger}H_1^{[2,2]})^\dagger}_{\text{effective ICI channels}}\right]^\dagger\right) \quad [\text{Equation 5}]$$

null(•) corresponds to an orthonormal basis of a null space of a corresponding matrix. To design a transmit beamforming vector that satisfies Equation 5 using a zero-forcing scheme, a base station may use at least four antennas. However, according to embodiments, even though M=3, it is possible to generate the transmit beamforming vector satisfying Equation 5.

Hereinafter, a method of controlling interference without feeding back global channel state information (CSI) using an uplink will be described. A first operation corresponds to an operation of sharing information associated with an interference channel between intra cell terminals. For example, terminal[1,2] and terminal[2,2] may exchange information associated with an interference channel to generate an effective receive beamforming vector. For example, the terminal [1,2] may transmit, to the terminal[2,2], information associated with an interference channel $H_1^{[1,2]}$ from a first base station to the terminal[1,2]. The terminal[2,2] may transmit, to the terminal [1,2], information associated with an interference channel $H_1^{[2,2]}$ from the first base station to the terminal [2,2]. Information associated with the interference channel may include channel quality information (CQI). As described above, a resource unused for communication with the base station, Wi-Fi, and/or the like may be used to transmit information associated with the interference channel.

Sharing of information associated with the interference channel may be performed in such a manner that one terminal between two terminals transmits information associated with a corresponding interference channel to the other terminal. Instead of each terminal transmitting associated with an interference channel of each terminal to other terminals, one terminal may receive information associated with interference channels of other terminals, whereby information may be shared. Specifically, the operation of sharing information associated with an interference channel may be sufficiently performed in such a manner that at least one terminal obtains information associated with interference channels of other terminals.

A second operation corresponds to an operation of determining a receive beamforming vector. Receive beamforming vectors $w^{[1,2]}$ and $w^{[2,2]}$ may be determined based on the exchanged information associated with the interference channel $H_1^{[1,2]}$ of the terminal[1,2] and information associated with the interference channel $H_1^{[2,2]}$ of the terminal[2,2]. That is, the terminal[1,2] and the terminal[2,2] may effectively control interference by determining receive beamforming vectors so that two effective interference channels using the receive beamforming vectors may be aligned in one spatial dimension, as expressed by Equation 6.

$$\text{span}(H_1^{[1,2]\dagger}w^{[1,2]}) = \text{span}(H_1^{[2,2]\dagger}w^{[2,2]}) \quad [\text{Equation 6}]$$

In Equation 6, span(•) corresponds to a space spanning a column vector of a corresponding matrix. Receive beamforming vectors satisfying Equation 6 may be readily obtained according to Equation 7.

$$\underbrace{\begin{bmatrix} I_M & -H_1^{[1,2]\dagger} & 0 \\ I_M & 0 & -H_1^{[2,2]\dagger} \end{bmatrix}}_{6 \times 7} \begin{bmatrix} H_1^{ICI} \\ w^{[1,2]} \\ w^{[2,2]} \end{bmatrix} = M_1 x_1 = 0 \quad [\text{Equation 7}]$$

In Equation 7, $h_1^{ICI}$ corresponds to a direction of an effective interference channel aligned from each of the terminal [1,2] and the terminal[2,2] to the first base station. A matrix $M_1$ has a dimension of 6×7 and thus, one dimension of null space may be present. Accordingly, the receive beamforming vectors satisfying Equation 6 and Equation 7 may be determined at a relatively high probability.

There may be no need to perform determining of a receive beamforming vector at all the terminals, for instance. As described above, when at least one terminal may obtain information associated with interference channels of other terminals during an interference channel sharing process, the at least one terminal may determine even receive beamforming vectors of the other terminals, and may transmit the corresponding receive beamforming vectors to the other terminals. For example, a complexity of determining the receive beamforming vector may significantly decrease.

A third operation corresponds to an operation of feeding back an effective channel to a base station. Instead of feeding back global CSI, each terminal may feed back information associated with an effective channel using a receive beamforming vector, that is, an effective serving channel and an effective interference channel. Also, all of interference channels may be designed to be aligned in the same direction by the second operation. Therefore, when at least one terminal feeds back information associated with an effective interference channel, other terminals may have no need to feed back information associated with an effective interference channel. For example, at least one of the terminal[1,2] and the terminal[2,2] may feed back at least one of $w^{[l,2]\dagger}H_1^{[l,2]}$ (l=1, 2). Accordingly, it may be possible to significantly decrease a usage of uplink resources.

At least one of the terminal[1,2] and the terminal[2,2] may directly transmit information associated with the effective interference channel to the first base station, and may also transmit information associated with the effective interference channel to the first base station via a second base station.

Each of the terminal[1,2] and the terminal[2,2] may feed back, to the second base station, information associated with a serving channel from the second base station.

A fourth operation corresponds to an operation of determining a transmit beamforming vector based on an effective interference channel.

The first base station may need to generate the transmit beamforming vector in order to simultaneously cancel interference to the terminal[1,2] and the terminal[2,2] of a second cell and intra user interference (IUD occurring between terminal[1,1] and terminal[2,1] of a first cell. Accordingly, the first base station may design transmit beamforming vectors for the terminal[1,1] and the terminal[2,1] as expressed by Equation 8.

$$v^{[1,1]} \subset \text{null}([(w^{[2,1]\dagger}H_1^{[2,1]})^\dagger, h_2^{ICI}]^\dagger)$$

$$v^{[2,1]} \subset \text{null}([(w^{[1,1]\dagger}H_1^{[1,1]})^\dagger, h_2^{ICI}]^\dagger) \quad \text{[Equation 8]}$$

The aforementioned methods may be applicable to the second base station, the terminal[1,1], and the terminal[2,1]. The above-described method may be applicable to a case where a number of terminals is K. In addition, the above-described method may be applicable to a multi-cell communication system and to a hierarchical cell communication system.

When each base station includes (M=K+1) antennas in a multiple input multiple output (MIMO)-Interfering Broadcast Channels (IFBC) having two cells each including a base station simultaneously serving K terminals are present, the interference controlling method may obtain 2K DoF.

When (M,N,K)=(K+1,K,K), the interference controlling method may be compared with other schemes.

In the case of a DoF comparison, schemes, for example, a coordinated zero-forcing scheme and a subspace IA scheme, may achieve K+1 DoF and 2(K−1) DoF. The interference controlling method may achieve 2K DoF much greater than the above schemes. In particular, when K=2, the interference controlling method may have an optimal solution in an aspect of DoF.

Referring to uplink overhead as shown in Table 1, below, the interference controlling method according to the embodiments may have relatively low uplink overhead compared to the coordinated zero-forcing scheme. The interference controlling method may use relatively high uplink overhead compared to the subspace IA scheme, however, may achieve relatively high DoF.

TABLE 1

| Schemes | Achievable degrees of freedom | Channel feedback for serving cell[†] | Channel feedback for interfering cell[†] | Total channel feedback[†] |
|---|---|---|---|---|
| CZF [5] | K + 1 | $2(K+1)K^2$ | $2(K+1)K^2$ | $4(K+1)K^2$ |
| Subspace IA [11] | 2(K − 1) | $2K^2$ | 0 | $2K^2$ |
| Proposed IA | 2K | $2K(K+1)$ | $2(K+1)$ | $2(K+1)^2$ |

[†]The number of complex valued elements needed for channel feedback.

Figure 5:
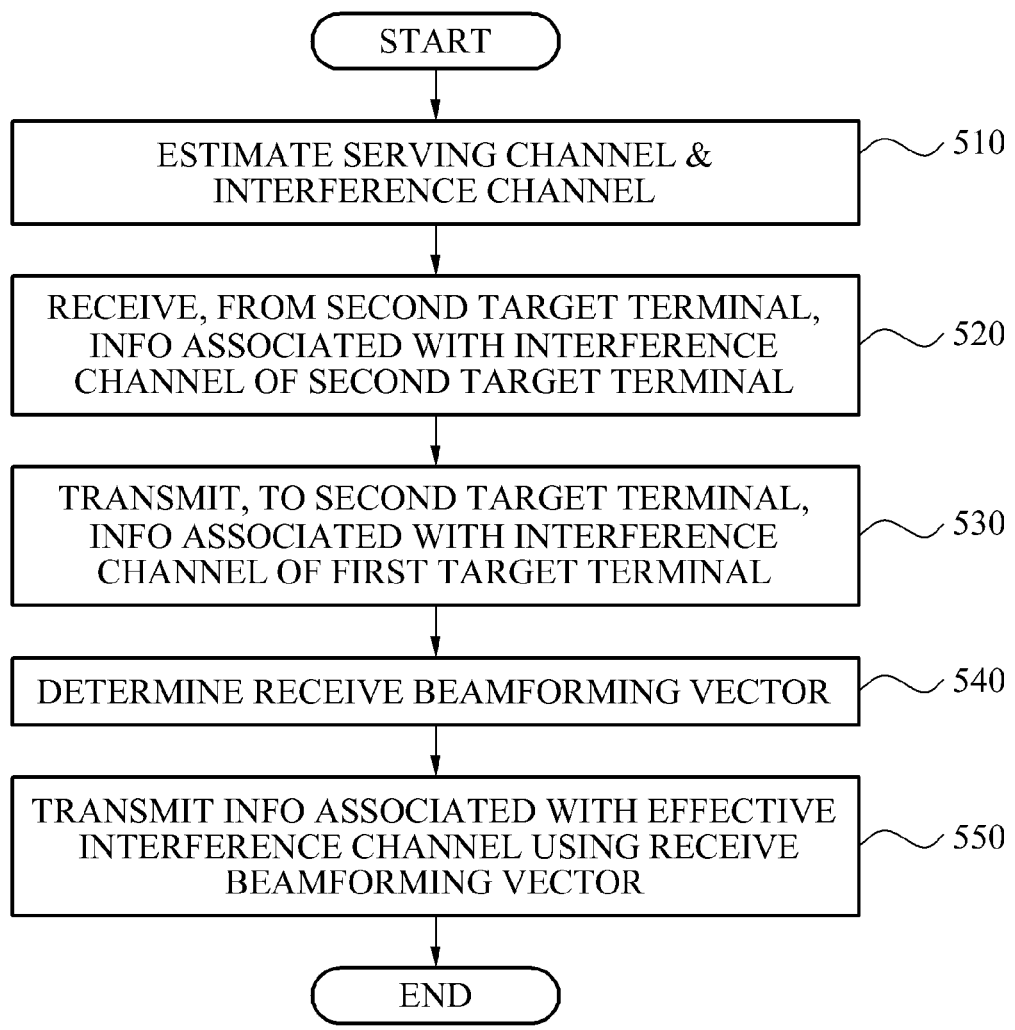
FIG. 5 is a flowchart illustrating a communication method of a first target terminal corresponding to a target base station of a target cell in a multi-cell communication system.

FIG. 5 illustrates a communication method of a first target terminal corresponding to a target base station of a target cell in a multi-cell communication system.

In the multi-cell communication system, the target cell may include the target base station, the first target terminal, and a second target terminal, and a neighboring cell may include a neighboring base station and neighboring terminals. The first target terminal, the second target terminal, the target base station, and the neighboring base station of FIG. 5 may correspond to the terminal[1,2], the terminal[2,2], the first base station, and the second base station of FIG. 4, respectively.

In operation 510, the first target terminal may estimate a serving channel and an interference channel based on pilot signals from the target base station and the neighboring base station.

In operation 520, the first target terminal may receive, from the second target terminal, information associated with an interference channel of the second target terminal. For example, the first target terminal may receive, from the second target terminal, information associated with the interference channel from the neighboring base station to the second target terminal corresponding to the target base station. Information associated with the interference channel of the second target terminal may be received using a resource orthogonal to a resource used in the target cell, or a Wi-Fi system, for example.

In operation 530, the first target terminal may transmit, to the second target terminal, information associated with an interference channel of the first target terminal. For example, the first target terminal may transmit, to the second target terminal, information associated with the interference channel from the neighboring base station to the first target terminal.

Depending on embodiments, transmission of information associated with the interference channel of the first target terminal may be omitted. For example, when the second target terminal does not transmit information associated with an effective interference channel from the neighboring base station to the first target terminal or information associated with an effective interference channel from the neighboring base station to the second target terminal, the first target terminal may transmit information associated with the effective interference channel from the neighboring base station to the first target terminal.

In operation 540, the first target terminal may determine a receive beamforming vector of the first target terminal based on information associated with the interference channel of the first target terminal and information associated with the interference channel of the second target terminal, so that the effective interference channel from the neighboring base station to the first target terminal using the receive beamforming vector of the first target terminal and the effective interference channel from the neighboring base station to the second target terminal using a receive beamforming vector of the second target terminal may be aligned in the same spatial dimension.

Similarly, the first target terminal may determine the receive beamforming vector of the second target terminal based on information associated with the interference channel of the first target terminal and information associated with the interference channel of the second target terminal, so that the effective interference channel from the neighboring base station to the first target terminal using the receive beamforming vector of the first target terminal and the effective interference channel from the neighboring base station to the second target terminal using the receive beamforming vector of the second target terminal may be aligned in the same spatial dimension.

In operation 550, the first target terminal may transmit, to the neighboring base station, information associated with the effective interference channel from the neighboring base station to the first target terminal using the receive beamforming vector of the first target terminal. For example, the first target terminal may also transmit information associated with the effective interference channel of the first target terminal to the neighboring base station via the target base station.

Figure 6:
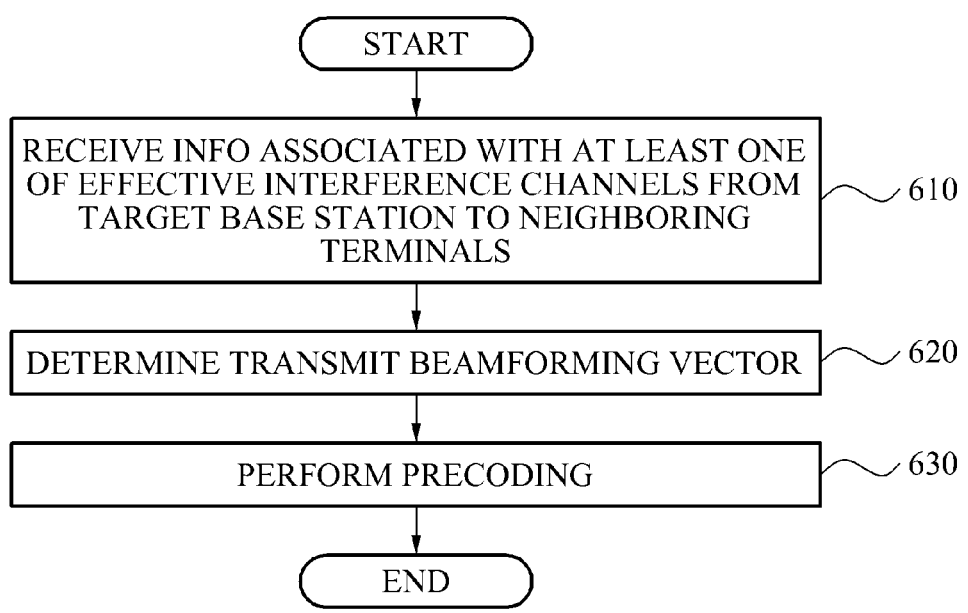
FIG. 6 is a flowchart illustrating a communication method of a target base station of a target cell in a multi-cell communication system.

FIG. 6 illustrates a communication method of a target base station of a target cell in a multi-cell communication system.

In the multi-cell communication system, the target cell may include the target base station, a first target terminal, and a second target terminal, and a neighboring cell may include a neighboring base station and neighboring terminals. The target base station, the first target terminal, and the second target terminal, the neighboring base station, and the neighboring terminals of FIG. 6 may correspond to the first base station, the terminal[1,1], the terminal[2,1], the second base station, the terminal[1,2], and the terminal[2,2] of FIG. 4, respectively.

In operation 610, the target base station may receive information associated with at least one of effective interference channels from the target base station to the neighboring terminals, when receive beamforming vectors of the neighboring terminals are determined so that the effective interference channels from the target base station to the neighboring terminals using receive beamforming vectors of the neighboring terminals may be aligned in the same spatial dimension. For example, the target base station may receive, from either the neighboring base station or at least one of the neighboring terminals, information associated with at least one of the effective interference channels from the target base station to the neighboring terminals.

The target base station may receive information associated with an effective interference channel from the neighboring base station to the first target terminal using the receive beamforming vector of the first target terminal, and may transmit, to the neighboring base station, information associated with the effective interference channel from the neighboring base station to the first target terminal so that the neighboring base station may determine a transmit beamforming vector.

The target base station may receive, from the second target terminal, information associated with an effective serving channel from the target base station to the second target terminal using the receive beamforming vector of the second target terminal. The target base station may receive, from the first target terminal, information associated with an effective serving channel of the first target terminal.

In operation 620, the target base station may determine a transmit beamforming vector for the first target terminal corresponding to the target base station, so that at least one of the effective interference channels from the target base station to the neighboring terminals and the effective serving channel from the target base station to the second target terminal using the receive beamforming vector of the second target terminal corresponding to the target base station may be nulled.

Similarly, the target base station may determine a transmit beamforming vector for the second target terminal corresponding to the target base station, so that at least one of the effective interference channels from the target base station to the neighboring terminals and the effective serving channel from the target base station to the first target terminal using the receive beamforming vector of the first target terminal corresponding to the target base station may be nulled.

In operation 630, the target base station may perform precoding based on the transmit beamforming vector for the first target terminal and the transmit beamforming vector for the second target terminal.

Figure 7:
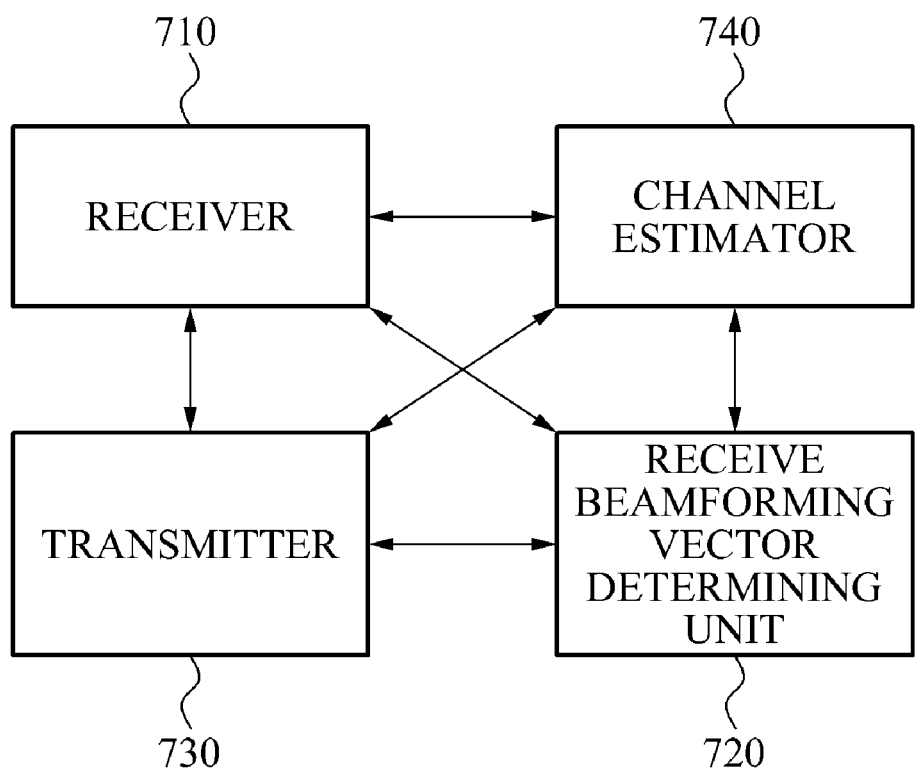
FIG. 7 is a diagram illustrating a first target terminal corresponding to a target base station of a target cell in a multi-cell communication system.

FIG. 7 illustrates a first target terminal corresponding to a target base station of a target cell in a multi-cell communication system.

As shown, the first target terminal may include a receiver 710, a receive beamforming vector determining unit 720, a transmitter 730, and a channel estimator 740.

The receiver 710 may be configured to receive, from a second target terminal corresponding to the target base station, information associated with an interference channel from a neighboring base station of a neighboring cell to the second target terminal. The receiver 710 may receive, from the second target terminal, information associated with the interference channel from the neighboring base station to the second target terminal using a resource orthogonal to a resource used in the target cell or a Wi-Fi system, for instance.

The receive beamforming vector determining unit 720 may be configured to determine a receive beamforming vector of the first target terminal based on information associated with an interference channel from the neighboring base station to the first target terminal and information associated with an interference channel from the neighboring base station to the second target terminal, so that an effective interference channel from the neighboring base station to the first target terminal using the receive beamforming vector of the first target terminal and an effective interference channel from the neighboring base station to the second target terminal using a receive beamforming vector of the second target terminal may be aligned in the same spatial dimension. Using the same method, the receive beamforming vector determining unit 720 may be configured to determine a receive beamforming vector of the second target terminal.

The transmitter 730 may be configured to transmit, to the neighboring base station, information associated with the effective interference channel from the neighboring base station to the first target terminal using the receive beamforming vector of the first target terminal. For example, the transmitter 730 may transmit, to the neighboring base station via the target base station, information associated with the effective interference channel from the neighboring base station to the first target terminal.

When the second terminal does not transmit, to the neighboring base station, information associated with the effective interference channel from the neighboring base station to the first target terminal or information associated with the effective interference channel from the neighboring base station to the second target terminal, the transmitter 730 may transmit information associated with the effective interference channel from the neighboring base station to the first target terminal The transmitter 730 may be configured to transmit, to the second target terminal, information associated with the interference channel from the neighboring base station to the first target terminal. Also, the transmitter 730 may be configured to transmit, to the second target terminal, information associated with the receive beamforming vector of the second target terminal.

The channel estimator 740 may be configured to estimate a serving channel from the target base station to the first target terminal based on a pilot signal received from the target base station, and may estimate an interference channel from the neighboring base station to the first target terminal based on a pilot signal received from the neighboring base station.

Figure 8:
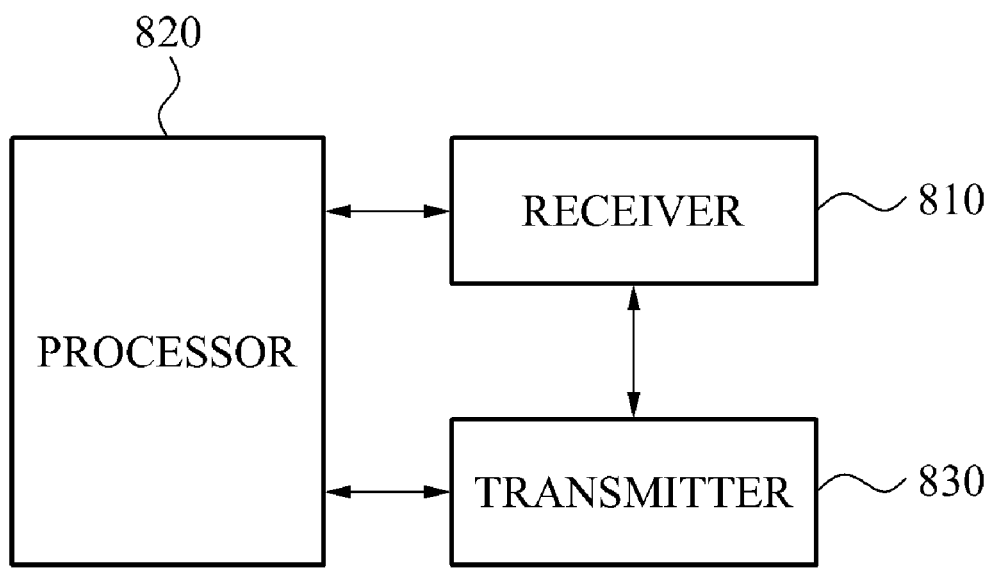
FIG. 8 is a diagram illustrating a target base station of a target cell serving a first target terminal and a second target terminal in a multi-cell communication system.

FIG. 8 illustrates a target base station of a target cell serving a first target terminal and a second target terminal in a multi-cell communication system.

As shown, the target base station may include a receiver 810, a processor 820, and a transmitter 830.

When receive beamforming vectors of neighboring terminals of a neighboring cell are determined so that effective interference channels from the target base station to the neighboring cells using the receive beamforming vectors of the neighboring terminals aligned in the same spatial dimension, the receiver 810 may be configured to receive information associated with at least one of effective interference channels from the target base station to the neighboring terminals.

For instance, the receiver 810 may be configured to receive information associated with an effective interference channel from a neighboring base station of the neighboring cell to the first target terminal using the receive beamforming vector of the first target terminal. The receiver 810 may receive, from the second target terminal, information associated with an effective serving channel from the target base station to the second target terminal using the receive beamforming vector of the second target terminal. And the receiver 810 may receive, from the first target terminal, information associated with the effective serving channel of the first target terminal.

The processor 820 may be configured to process information received via the receiver 810. The processor 820 may determine a transmit beamforming vector for the first target terminal corresponding to the target base station based on information associated with at least one of the effective interference channels from the target base station to the neighboring terminals, so that at least one of the effective interference channels from the target base station to the neighboring terminals and the effective serving channel from the target base station to the second target terminal using the receive beamforming vector of the second target terminal corresponding to the target base station may be nulled. Using the same method, the processor 820 may be configured to determine the transmit beamforming vector for the second target terminal.

For instance, the processor 820 may be configured to perform precoding based on the transmit beamforming vector for the first target terminal and the transmit beamforming vector for the second target terminal.

The transmitter 830 may be configured to transmit precoded signals. The transmitter 830 may transmit, to the neighboring base station, information associated with the effective interference channel to the first target terminal.

The first target terminal, the target base station, and the communication method of the first target terminal and the target base station according to the embodiments are described above. The embodiments described above with reference to FIG. 1 through FIG. 4 may be applicable to the first target terminal, the target base station, and the communication method of the first target terminal and the target base station according to the present embodiment.

According to one or more embodiments, the terminals may be cellular telephones, smart phones, personal digital assistants (PDA), notebook, laptop and tablet computers and computing device and/or other wireless mobile devices.

According to one or more embodiments, it may be possible to efficiently use resources by enabling intra cell terminals to exchange channel information, for example, interference channel information using a resource unaffecting communication with a base station, for example, using a resource orthogonal to a resource used for the communication with the base station or a Wi-Fi, and by determining a receive beamforming vector based on the exchanged channel information.

According to one or more embodiments, a terminal may feed back information associated with an effective interference channel that is associated with a receive beamforming vector, thereby decreasing feedback overhead.

According to one or more embodiments, intra cell coordinated terminals may determine a receive beamforming vector so that effective interference channels may be aligned in the same spatial dimension, thereby enabling at least one of coordinated terminals to feed back information associated with an effective interference channel. Accordingly, it is possible to decrease feedback overhead, and to enhance the antenna efficiency.

According to one or more embodiments, a base station of a target cell may determine a transmit beamforming vector based on an effective interference channel of a neighboring cell terminal that is associated with a receive beamforming vector of the neighboring cell terminal and an effective interference channel of a target cell terminal that is associated with a receive beamforming vector of the target cell terminal.

The processes, functions, methods and/or software described above may be recorded, stored, or fixed in one or more non-transitory computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a non-transitory computer-readable storage medium may be distributed among computer systems connected through a network and non-transitory computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method of a first target terminal corresponding to a target base station of a target cell in a multi-cell communication system, the method comprising:
receiving, from a second target terminal corresponding to the target base station, information associated with an interference channel from a neighboring base station of a neighboring cell to the second target terminal;
determining a receive beamforming vector of the first target terminal based on information associated with an interference channel from the neighboring base station to the first target terminal and information associated with an interference channel from the neighboring base station to the second target terminal, so that an effective interference channel from the neighboring base station to the first target terminal that is associated with the receive beamforming vector of the first target terminal and an effective interference channel from the neighboring base station to the second target terminal that is associated with a receive beamforming vector of the second target terminal are aligned in the same spatial dimension; and transmitting, to the neighboring base station, information associated with the effective interference channel from the neighboring base station to the first target terminal that is associated with the receive beamforming vector of the first target terminal.

2. The method of claim 1, wherein the receiving comprises:

receiving, from the second target terminal, information associated with the interference channel from the neighboring base station to the second target terminal using a resource orthogonal to a resource used in the target cell or a wireless fidelity (Wi-Fi) system.

3. The method of claim 1, wherein the transmitting comprises:

transmitting information associated with the effective interference channel from the neighboring base station to the first target terminal when the second terminal does not transmit, to the neighboring base station, information associated with the effective interference channel from the neighboring base station to the first target terminal or information associated with the effective interference channel from the neighboring base station to the second target terminal.

4. The method of claim 1, wherein the transmitting comprises:

transmitting, to the neighboring base station via the target base station, information associated with the effective interference channel from the neighboring base station to the first target terminal.

5. The method of claim 1, further comprising:

transmitting, to the second target terminal, information associated with the interference channel from the neighboring base station to the first target terminal.

6. The method of claim 1, wherein the determining comprises:

determining the receive beamforming vector of the second target terminal based on information associated with the interference channel from the neighboring base station to the first target terminal and information associated with the interference channel from the neighboring base station to the second target terminal, so that the effective interference channel from the neighboring base station to the first target terminal that is associated with the receive beamforming vector of the first target terminal and the effective interference channel from the neighboring base station to the second target terminal that is associated with the receive beamforming vector of the second target terminal are aligned in the same spatial dimension.

7. The method of claim 6, further comprising:

transmitting, to the second target terminal, information associated with the receive beamforming vector of the second target terminal.

8. A communication method of a target base station of a target cell in a multi-cell communication system, the method comprising:

receiving information associated with at least one of effective interference channels from the target base station to neighboring terminals of a neighboring cell when receive beamforming vectors of the neighboring terminals are determined so that the effective interference channels from the target base station to the neighboring cells that is associated with receive beamforming vectors of the neighboring terminals are aligned in the same spatial dimension; and determining a transmit beamforming vector for a first target terminal corresponding to the target base station, so that at least one of the effective interference channels from the target base station to the neighboring terminals, and an effective serving channel from the target base station to the second target terminal corresponding to the target base station that is associated with a receive beamforming vector of the second target terminal are nulled.

9. The method of claim 8, further comprising:

performing precoding based on the transmit beamforming vector for the first target terminal.

10. The method of claim 8, wherein the receiving comprises receiving, from either a neighboring base station of the neighboring cell or at least one of the neighboring terminals, information associated with at least one of the effective interference channels from the target base station to the neighboring terminals.

11. The method of claim 8, further comprising:

receiving information associated with an effective interference channel from a neighboring base station of the neighboring cell to the first target terminal that is associated with the receive beamforming vector of the first target terminal; and transmitting, to the neighboring base station, information associated with the effective interference channel from the neighboring base station to the first target terminal.

12. The method of claim 8, further comprising:

receiving, from the second target terminal, information associated with the effective serving channel from the target base station to the second target terminal that is associated with the receive beamforming vector of the second target terminal.

13. The method of claim 8, further comprising:

determining a transmit beamforming vector for the second target terminal corresponding to the target base station, so that at least one of the effective interference channels from the target base station to the neighboring terminals and an effective servicing channel from the target base station to the first target terminal corresponding to the target base station that is associated with a receive beamforming vector of the first target terminal are nulled.

14. A first target terminal corresponding to a target base station of a target cell in a multi-cell communication system, the first terminal comprising:

a receiver configured to receive, from a second target terminal corresponding to the target base station, information associated with an interference channel from a neighboring base station of a neighboring cell to the second target terminal;

a receive beamforming vector determining unit configured to determine a receive beamforming vector of the first target terminal based on information associated with an interference channel from the neighboring base station to the first target terminal and information associated with an interference channel from the neighboring base station to the second target terminal, so that an effective interference channel from the neighboring base station to the first target terminal that is associated with the receive beamforming vector of the first target terminal and an effective interference channel from the neighboring base station to the second target terminal that is associated with a receive beamforming vector of the second target terminal are aligned in the same spatial dimension; and a transmitter configured to transmit, to the neighboring base station, information associated with the effective interference channel from the neighboring base station to the first target terminal this associated with the receive beamforming vector of the first target terminal.

15. The first target terminal of claim 14, wherein the receiver is configured to receive, from the second target terminal, information associated with the interference channel from the neighboring base station to the second target terminal using a resource orthogonal to a resource used in the target cell or a wireless fidelity (Wi-Fi) system.

16. The first target terminal of claim 14, wherein the transmitter is configured to transmit information associated with the effective interference channel from the neighboring base station to the first target terminal when the second terminal does not transmit, to the neighboring base station, information associated with the effective interference channel from the neighboring base station to the first target terminal or information associated with the effective interference channel from the neighboring base station to the second target terminal.

17. The first target terminal of claim 14, wherein the transmitter is configured to transmit, to the neighboring base station via the target base station, information associated with the effective interference channel from the neighboring base station to the first target terminal.

18. The first target terminal of claim 14, wherein the transmitter is configured to transmit, to the second target terminal, information associated with the interference channel from the neighboring base station to the first target terminal.

19. The first target terminal of claim 14, wherein the receive beamforming vector determining unit is configured to determine the receive beamforming vector of the second target terminal based on information associated with the interference channel from the neighboring base station to the first target terminal and information associated with the interference channel from the neighboring base station to the second target terminal, so that the effective interference channel from the neighboring base station to the first target terminal that is associated with the receive beamforming vector of the first target terminal and the effective interference channel from the neighboring base station to the second target terminal that is associated with the receive beamforming vector of the second target terminal are aligned in the same spatial dimension.

20. The first target terminal of claim 19, wherein the transmitter is configured to transmit, to the second target terminal, information associated with the receive beamforming vector of the second target terminal.

21. The first target terminal of claim 14, further comprising:
a channel estimator configured to estimate a serving channel from the target base station to the first target terminal based on a pilot signal received from the target base station, and to estimate an interference channel from the neighboring base station to the first target terminal based on a pilot signal received from the neighboring base station.

* * * * *